No. 620,028. Patented Feb. 21, 1899.
F. B. GILBRETH.
MIXER FOR CONCRETE, CEMENT, OR OTHER SUBSTANCES.
(Application filed Aug. 5, 1898.)
(No Model.)
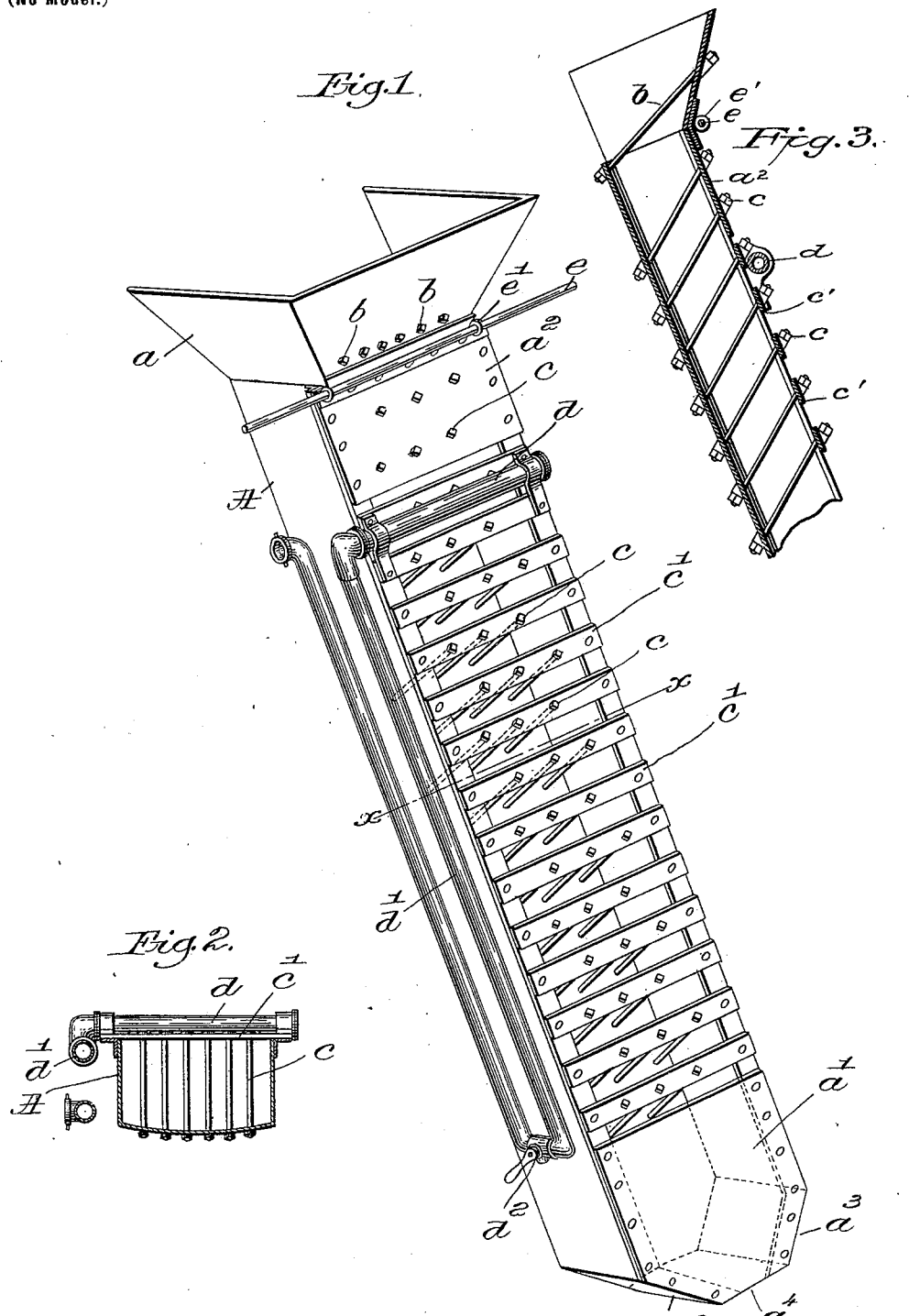

UNITED STATES PATENT OFFICE.

FRANK B. GILBRETH, OF BOSTON, MASSACHUSETTS, ASSIGNOR OF ONE-HALF TO LEONARD C. WASON, OF BROOKLINE, MASSACHUSETTS.

MIXER FOR CONCRETE, CEMENT, OR OTHER SUBSTANCES.

SPECIFICATION forming part of Letters Patent No. 620,028, dated February 21, 1899.

Application filed August 5, 1898. Serial No. 687,789. (No model.)

*To all whom it may concern:*

Be it known that I, FRANK B. GILBRETH, of Boston, county of Suffolk, State of Massachusetts, have invented an Improvement in Mixers for Concrete, Cement, or other Substances, of which the following description, in connection with the accompanying drawings, is a specification, like letters on the drawings representing like parts.

This invention has for its object to provide a novel and improved device for automatically mixing the various components of concrete, cement, mortar, and other substances of like or equivalent nature where it is desired to effect a thorough mixture between various elements or substances.

The principal aim I have had in mind in devising a mixer containing my invention has been to provide a mixer of extreme simplicity and of little cost and one which can be erected or put into position with little difficulty and without any previous elaborate preparation or construction.

The various features of my invention will be hereinafter set forth in connection with a description of the best embodiment of my invention now known to me, it being understood, however, at the outset that my invention is not restricted to the particular embodiment which I have herein selected for illustration.

In the drawings, Figure 1, in perspective, shows a mixer embodying my invention; Fig. 2, a horizontal section on the dotted line $xx$, Fig. 1; and Fig. 3, a longitudinal sectional detail through the middle line of the hopper and the adjacent part of the chute.

Referring to the drawings, in the embodiment of my invention there shown A is a long chute or trough, preferably substantially open at one of its sides—for instance, the front side—at which are located the cleats $c'$, and provided at its upper end with a suitable receiving-hopper $a$ (shown as open at its rear side) and at its lower end with a receiving box or receptacle, which I shall hereinafter designate as a "receiver" $a'$. This chute may be conveniently and cheaply made of wood; but for convenience in transportation and handling and for durability I have found sheet metal to furnish very satisfactory results.

Preferably the front side of the chute A, at or near the upper end of the latter—that is, immediately below the hopper $a$—is closed by a front plate $a^2$, forming a receiving-chamber to prevent escape of the sand, cement, &c., when first thrown into the mixer.

At the bottom or outlet of the hopper $a$ is arranged a suitable grating or screen, herein shown as composed of a plurality of pins $b$, preferably parallel and also removable. These pins are arranged in such proximity as to exclude from passage through the mixer all stones or lumps of such size as would interfere with the proper mixing of the various substances or with the efficiency of the completed mixture when taken from the device. The plane in which the rods $b$ are located is such as to give to each rod an inclination, shown as toward the back or open side of the hopper, to thereby cause stones, lumps, &c., excluded from the mixer by the rods to gravitate to one side, in the present instance out from the hopper and onto the floor, where they will not interfere with the proper use of the mixer.

After the material deposited in the hopper passes therefrom through the sieve or grate at $b$ $b$ it thereafter meets and is acted upon by a succession of combined dividing and mixing members, shown as and preferably in the form of pins $cc$. These mixing members $c$ $c$ are herein shown as arranged in series of three, or it may be any other desired number, each series transversely of the chute, said mixing members $c$ being shown as standing across the interior of the chute from the cleats or supports $c'$ $c'$ to the opposite closed side or bottom of the chute. Preferably these pin-like mixing members will penetrate the bottom or closed side of the chute and be provided at the outside of the bottom with some suitable means for retaining them in position, but which, when desired, will permit removal of the pins to facilitate cleaning when necessary.

As the material or materials to be mixed gravitate down through the chute they are divided or split by striking the first series of pins $c$, and the divided or split portions are thrown against each other, and thus more or less mixed, and again split or divided by the next series of pins, this dividing and throwing together or mixing being repeated at each series of pins throughout the length of the chute wherein such pins are arranged.

Obviously the most effective dividing and mixing is accomplished by staggering the members or pins $c\,c$ of one series with reference to the members or pins of the next adjacent series, as indicated in the drawings, although I do not regard this staggering as absolutely essential, for it is a fact that when succeeding series of pins are arranged one beyond the other in the direct line of travel or fall of the material passing through the chute the material divided by the pins of one series will be thrown together and divided by the pins of the next series. The mixing members are herein shown as pins; but obviously substantially the same action—viz., the dividing of the material and subsequent mixing thereof—could as well be performed by members differently constructed or shaped—as, for example, flat plates standing outwardly with reference to the bottom of the chute with their edges opposed to the direction of fall of the material—and, therefore, the words "mixing-pins" or "pins," as herein used and employed in the claims, are intended to cover and include all forms of mixing members that act to divide the body of material flowing against the same, permitting the divided material again to be brought together and divided as before, according to the principle herein set forth. It will also be noticed that the mixing pins or members stand outwardly with reference to the bottom of the chute, and while they are here shown as exactly parallel one with another yet obviously exact parallelism is not essential, for any arrangement of the pins whereby they are approximately parallel—that is, whereby as a whole they stand outwardly with reference to the bottom of the chute so as to divide the material passing through the same—would come within the scope of my invention, as distinguished from any members arranged in substantial parallelism with the bottom of the chute and which would act to divide the body of material flowing therethrough into superposed layers or strata instead of into columns to be again thrown together and mixed as in my invention. I have also found that for the most thorough mixing of all the various substances it is quite important to concentrate the materials after they are split by the dividing and mixing members during the passage of the materials through the chute, and to this end my invention comprehends diverting or deflecting such materials during their passage through the chute to one side the normal path of gravitation, so as to produce such concentration as will produce the most efficient mixing. This I prefer to accomplish as follows: I provide an inclined surface, as by inclining the chute, so as to constitute the bottom of the chute such inclined surface, thereby to concentrate on this inclined surface the materials passing through the chute. I have also made this inclined surface or bottom of the chute concaved or trough-like in the direction of its length, so that the materials gravitating down the same tend constantly to concentrate along the middle or lowest line thereof. Furthermore, I have inclined the dividing and mixing members $c\,c$ so to divert the materials striking the same to the side toward which the concentration takes place, said members being herein inclined with reference to the bottom of the chute so that the material, particularly the stones or heavier particles, striking the said members is acted upon thereby and thrown back into the mass upon the inclined surface or bottom. The combined action of these various features of construction upon the material passing through the chute may be described as follows: The coarser lumps or stones are excluded by the screen-pins $b\,b$ and roll out of the hopper. The material that passes from the hopper into the chute is divided by the first series of pins, is thrown together, and again divided by the next series, and so on. In addition to this the inclination of the pins tends constantly to divert the material to one side, herein upon the inclined bottom of the chute, this, with the trough-like formation of the bottom, acting to concentrate the divided and mixed material along the central line of the bottom, thus more thoroughly intermixing the various substances or particles after each division thereof by the members $c$.

By reason of the inclination of the bottom surface of the hopper described the gravitating material flowing over the same tends to roll or slide in contact therewith, thus preventing the heavier particles from gaining on the lighter ones and further adding to the effectiveness of the mixer.

Any particles, usually the stones, which tend to bound down through the chute instead of flow along the bottom thereof are constantly beat back by the pins $c$ into the mass on the bottom, thus further assisting in the mixing of the various substances.

The bottom of the receiving-chamber at $a'$ furnishes a suitable receptacle for the mixture at such times as the removal of the mixture is interrupted. For instance, the bottom of the chamber is contracted, as at $a^3$, to form an opening $a^4$, which may be conveniently closed by the workman's shovel, the blade of which is inserted within the opening and supported on the inner inclined face of one receiver-wall, enabling the workman by lifting the handle to completely close the delivery end of the mixer. During such time as it is closed in this manner—for instance, while the workmen are changing wheelbarrows, buckets, or whatever is used to carry away the mixture—the receiver $a'$ takes care of all the mixture that descends through the mixer.

In the vicinity of the upper end of the mixer I have arranged a suitable water spraying or delivering device, herein shown as in the form of a transversely-arranged pipe $d$, perforated along its under side so as to deliver water within the mixer at the proper point, preferably intermediate the length of the chute, in order that when the dry mixture of the various substances has been sufficiently effected further mixing of the same by the mixing members acts to incorporate therewith the proper quantity of water.

It is desirable for the best results that the mixture be first made while the substances are dry, and when this dry mixture has been sufficiently affected the water is introduced to complete the mixture and put it in proper condition for use. For this reason the water which is discharged from the pipe $d$ meets the dry mixture after the dry substances have been thoroughly mixed, herein approximately one-third or one-half the length of the chute, according to the inclination of the chute and the necessities of the case arising from the particular substances being mixed. The water thus projected upon the mass of materials gravitating through the mixer first acts upon and washes the heavier stones bounding from the mass against the pins and back again into the mass and finally meets and obtains its most effective mixing with the materials where they are concentrated and roll or slide along the depressed or inclined surface furnished by the bottom of the chute.

The inlet-pipe $d'$, which supplies the pipe $d$, is shown as depressed in loop form at one side of the mixer in order that the controlling-point, where is located the controlling-valve $d^2$, may be brought down into position convenient for the workman standing at the delivery end of the mixer. Thus the workman with his skilled eye will detect any variation in the mixture as it issues from the device, and if it is too dry he can by a simple movement of the valve add to the quantity of water mixed with the substances, or if the completed mixture is too wet he can restrict the quantity of water delivered, and thus at all times maintain the mixture at the proper consistency.

For convenience the valve $d^2$ is a well-known three-way valve or cock, whereby the water may be admitted to the device $d$ or completely cut off therefrom, or while cut off therefrom may be opened to permit the water in the pipe $d$ and the branches of the U leading thereto to drain off through the three-way valve, as is desirable in cold weather to prevent freezing; but my invention is not limited to this kind of valve or to this arrangement of supply-pipes.

The mixer may be supported in desired inclined position by any suitable supporting means, I having found it convenient to employ a bar, as $e$, carried through suitable eyes or rings $e'$ on the front side of the mixer and resting upon a floor or other rest, (not shown,) the normal tendency of this supporting means being to maintain the mixer in such an inclined position as will best tend to concentrate the mixing operation at the bottom or one side of the chute, and thereby prevent its scattering, as it would if the chute were truly vertical. Obviously the inclination of the chute may be changed more or less, according to the nature of the various materials mixed therein from time to time, it always being so inclined as to produce the most thorough mixing of the materials without clogging.

In fact, I have found that for the best results the mixer should be as nearly horizontal as possible and have the material gravitate freely through it without any tendency to clog, and I have found that means such as herein shown most conveniently hold the mixer at about the required angle.

Having described my invention, what I claim as new, and desire to secure by Letters Patent, is—

1. A mixer for concrete and the like consisting of an inclined, open-front chute or trough, with closed receiving-chambers at opposite ends thereof, and mixing means in said chute or trough and tending to direct the material away from the open side of said chute or trough.

2. A mixer for concrete and the like consisting of an inclined, open-front chute or trough provided at one end with a suitable hopper, a chamber immediately below the hopper to prevent scattering of the substances shoveled into the hopper, a receiving-chamber at the lower or delivery end of said chute or trough, and mixing means in the chute or trough and tending to direct the material away from the open side thereof.

3. A mixer for concrete and the like consisting of a chute or trough through which the material to be mixed may gravitate, a sieve or screen at the supply end of said chute, and mixing-pins arranged in said chute below said screen, said chute or trough being arranged in an inclined position whereby said mixing-pins tend constantly to direct the material within and toward the bottom surface of the chute.

4. In a mixer for concrete and the like, a chute with mixing members introduced along the length thereof all inclined with reference to the same side of the chute, whereby the material is deflected by said mixing members toward said side of the chute.

5. In a mixer for concrete and the like, an inclined chute having a trough-like bottom, and deflecting members arranged in said chute and inclined with reference to said trough-like bottom to coöperate with the latter in concentrating and mixing the material passing through said chute.

6. In a mixer for concrete and the like, a chute with mixing members introduced along the length thereof all inclined with reference to the same side of the chute, whereby the material is deflected by said mixing members toward said side of the chute, in combination with a water-supply device constructed and arranged to deliver water to the material while being mixed during its passage through said chute.

7. A gravity-mixer for concrete and the like, consisting of a chute or trough, a plurality of approximately parallel mixing-pins distributed in the length thereof, and a water-supply device constructed and arranged to deliver water to the material being mixed in its passage through said chute.

8. A mixer for concrete and the like, consisting of a chute or trough, a plurality of approximately parallel mixing-pins distributed in the length thereof, and a water-supply device arranged to deliver water upon the material being mixed intermediate the length of said chute, whereby both wet and dry mixing by said pins may take place simultaneously in the same chute.

9. In a gravity-mixer for concrete and the like, a gravity-chute with mixing-pins introduced along the length thereof, all constructed and arranged to present the said pins in an inclined position so as to deflect the material being mixed toward the bottom of said chute, and water-supplying means to deliver water upon the material being mixed intermediate the ends of said chute whereby wet and dry mixing may take place simultaneously in the same chute.

10. In a mixer for concrete and the like, the combination with an inclined chute having a trough-like bottom, of mixing members arranged in said chute and inclined with reference to said trough-like bottom to coöperate with the latter in concentrating and mixing the material passing through said chute, and a water-supply device to supply water to the material in said chute.

11. A gravity-mixer for concrete and the like, consisting of a chute or trough constructed and arranged to provide an inclined surface down which the material may gravitate during mixing, and a plurality of combined dividing and mixing devices standing outwardly with reference to said inclined surface for dividing and mixing the layer of material flowing down said inclined surface.

12. A gravity-mixer for concrete and the like, consisting of a chute or trough constructed and arranged to provide an inclined surface down which the material may gravitate during mixing, a plurality of combined dividing and mixing devices standing outwardly with reference to said inclined surface for dividing and mixing the layer of material flowing on said surface, and water-supplying means to supply water to the material upon said inclined surface, substantially as described.

13. A gravity-mixer for concrete and the like, consisting of a chute down which the material to be mixed may gravitate, combined with mixing members arranged in said chute, and tending constantly to divert the material acted upon by said members to one side of the natural path of gravitation during the passage of said material through said chute.

14. A gravity-mixer for concrete and the like, consisting of a chute down which the material to be mixed may gravitate, combined with mixing members arranged in said chute, to divert the material acted upon by said members to one side of the natural path of gravitation during the passage of said material through said chute, and water-supplying means to supply water to the diverted material.

15. A gravity-mixer for concrete and the like, consisting of a chute or trough constructed and arranged to provide an inclined surface down which the material may gravitate during mixing, and a plurality of combined dividing and mixing devices arranged in inclined position with reference to said inclined surface, for dividing and mixing the layer of material flowing on said surface, and by reason of their inclination with reference thereto, direct the divided material constantly toward the said inclined surface for concentration thereon as described.

16. A mixer for concrete and the like consisting of a chute or trough constructed and arranged to provide a concaved or trough-like inclined surface down which the material may gravitate during mixing and concentrate along the lowest point or points thereof, and a plurality of combined dividing and mixing devices arranged in inclined position with reference to said inclined surface, for dividing and mixing the layer of material flowing on said surface, and by reason of their inclination with reference thereto, direct the divided material constantly toward the said inclined surface for concentration thereon, as described.

17. A mixer for concrete and the like consisting of a chute or trough constructed and arranged to provide a concaved or trough-like inclined surface down which the material may gravitate during mixing and concentrate along the lowest point or points thereof, and a plurality of combined dividing and mixing devices arranged in inclined position with reference to said inclined surface, for dividing and mixing the layer of material flowing on said surface, and by reason of their inclination with reference thereto, direct the divided material constantly toward the said inclined surface for concentration thereon, and water-supplying means to project water upon the material being mixed so as first to act upon any particles that may bound above the layer upon the bottom and thereafter upon the particles in and constituting the said layer, for the purpose described.

18. A gravity-mixer for concrete and the like, consisting of a chute or trough down which the material to be mixed may gravitate, and mixing means arranged in said chute or trough, combined with supporting means for the said chute or trough constructed to permit the working inclination thereof to be shifted at will without changing any of the operative parts of the mixer.

In testimony whereof I have signed my name to this specification in the presence of two subscribing witnesses.

FRANK B. GILBRETH.

Witnesses:
LAURA MANIX,
JOHN C. EDWARDS.